United States Patent
Li et al.

(10) Patent No.: US 7,920,751 B2
(45) Date of Patent: Apr. 5, 2011

(54) ADAPTIVE GRADIENT WEIGHTING TECHNIQUE FOR DETECTOR BAD CELL CORRECTION

(75) Inventors: Baojun Li, Waukesha, WI (US); Jiang Hsieh, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 1054 days.

(21) Appl. No.: 11/687,410

(22) Filed: Mar. 16, 2007

(65) Prior Publication Data

US 2008/0226032 A1 Sep. 18, 2008

(51) Int. Cl.
*G06K 9/40* (2006.01)

(52) U.S. Cl. ........ 382/254; 382/300; 382/132; 382/128; 382/131; 382/133; 348/246; 348/272; 348/273; 250/200; 250/559.01; 250/559.03; 250/559.04; 250/559.05; 250/559.06; 250/559.07; 250/559.08; 250/559.45; 250/559.46

(58) Field of Classification Search .................. 382/128, 382/131–133, 254, 300; 250/200, 370.11, 250/559.01, 559.03–559.08, 559.4, 559.45, 250/559.46; 348/246
See application file for complete search history.

(56) References Cited

U.S. PATENT DOCUMENTS

| | | | | |
|---|---|---|---|---|
| 5,473,663 A | * | 12/1995 | Hsieh | 378/207 |
| 6,408,109 B1 | * | 6/2002 | Silver et al. | 382/300 |
| 6,421,084 B1 | * | 7/2002 | Chang et al. | 348/273 |
| 6,496,609 B1 | * | 12/2002 | Walter | 382/300 |
| 6,724,945 B1 | * | 4/2004 | Yen et al. | 382/274 |
| 6,792,159 B1 | * | 9/2004 | Aufrichtig et al. | 382/260 |
| 7,068,854 B1 | * | 6/2006 | Aufrichtig et al. | 382/275 |
| 7,502,505 B2 | * | 3/2009 | Malvar et al. | 382/162 |
| 7,577,315 B2 | * | 8/2009 | Uvarov et al. | 382/300 |
| 2004/0141072 A1 | * | 7/2004 | Nilsson et al. | 348/272 |
| 2005/0063513 A1 | * | 3/2005 | Hsieh et al. | 378/98.8 |
| 2006/0170801 A1 | * | 8/2006 | Dennis et al. | 348/294 |
| 2007/0002154 A1 | * | 1/2007 | Kang et al. | 348/272 |

* cited by examiner

*Primary Examiner* — Vikkram Bali
*Assistant Examiner* — Julian D Brooks
(74) *Attorney, Agent, or Firm* — Ziolkowski Patent Solutions Group, SC

(57) ABSTRACT

An imaging system includes a two-dimensional detector having a plurality of cells wherein each cell is configured to detect energy or signal passing through an object. The imaging system includes a computer programmed to acquire imaging data for the plurality of cells, identify a cell to be corrected, based on the imaging data, interpolate $I_x$ and $I_y$ for the identified cell based on neighbor cells, and calculate local gradients $g_x$ and $g_y$ between the identified cell and its neighbor cells based on the interpolation. The computer is further programmed to calculate weighting factors $w_x$ and $w_y$ based on the local gradients, calculate a corrected final value $I(0,0)$ for the identified cell, and correct the identified cell with the corrected final value.

23 Claims, 7 Drawing Sheets

ADAPTIVE GRADIENT WEIGHTING TECHNIQUE FOR DETECTOR BAD CELL CORRECTION

BACKGROUND OF THE INVENTION

The present invention relates generally to diagnostic imaging and, more particularly, to a method and apparatus of correcting bad cell data acquired in an imaging detector.

Typically, in computed tomography (CT) imaging systems, an x-ray source emits a fan-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-rays beams received at the detector, a scintillator for converting x-rays to light energy adjacent the collimator, and photodiodes for receiving the light energy from the adjacent scintillator and producing electrical signals therefrom.

Typically, each scintillator of a scintillator array converts x-rays to light energy. Each scintillator discharges light energy to for instance a backlit photodiode adjacent thereto. Each photodiode detects the light energy and outputs a corresponding electrical signal. The outputs of the photodiodes are then transmitted to the data processing system wherein a digital signal is generated, stored, and used for image reconstruction. Such devices may be used in conventional CT, x-ray, mammography, and tomosynthesis applications.

The backlit photodiodes are attached and electrically connected to a multi-layer substrate that carries the electrical signals from the back side of the photodiode to the data processing system through a flexible electrical circuit. Accordingly, for each pixel within a CT detector, the scintillator is optically coupled to the photodiode, and an electrical contact is typically made between the photodiode and the substrate, and between the substrate and the flexible electrical circuit. When a detector pixel develops an open or short condition, it is referred to as a "bad cell" or "bad pixel" and produces an insufficiently measured digital signal or no signal at all. A short condition can occur between a pixel and its neighbor pixel or between a pixel and ground. An open condition is primarily due to a completely disconnected pixel and tends to leak current into the neighboring pixels.

Typically, when imaging data is acquired without bad pixels, features within an image appear distinct from other features within the image. However, bad pixel data manifests itself as streaks or other image artifacts. Several algorithms are commonly known and applied to correct bad cells, such as, for instance, linearly interpolating values for a missing pixel by using surrounding neighbor pixels. However, when a bad cell or pixel occurs in an image near a sharp edge, such as, for instance, at a boundary between a high density material and a low density material, linear or higher order interpolation can result in over- or under-estimating the value of the pixel, thus increasing the propensity to cause streaks or image artifacts. Furthermore, bad cells or pixels may occur in blocks of, for instance, 3×1 or 3×3 cells and the like, thus exacerbating the problem.

Additionally, to improve resolution and performance, detector geometries other than conventional orthogonal grids are under consideration separate from, or in conjunction with, implementation of a wobbled focal spot. For instance, a diagonal detector geometry may improve resolution of a CT system. However, because of the increased processing complexity of building a diagonal cut detector, a diagonal detector may result in an increased number of bad cells. Additionally, because of the diagonal cut geometry, conventional interpolating algorithms are not sufficient to completely eliminate streaks and artifacts from images.

Therefore, it would be desirable to design a system and method to improve correction of data from bad cells in a CT detector for orthogonal pixel patterns and diagonal cut pixel patterns.

BRIEF DESCRIPTION OF THE INVENTION

The present invention provides a method and apparatus that overcome the aforementioned drawbacks.

According to an aspect of the present invention, an imaging system includes a two-dimensional detector having a plurality of cells wherein each cell is configured to detect energy or signal passing through an object. The imaging system includes a computer programmed to acquire imaging data for the plurality of cells, identify a cell to be corrected, based on the imaging data, interpolate $I_x$ and $I_y$ for the identified cell based on neighbor cells, and calculate local gradients $g_x$ and $g_y$ between the identified cell and its neighbor cells based on the interpolation. The computer is further programmed to calculate weighting factors $w_x$ and $w_y$ based on the local gradients, calculate a corrected final value $I(0,0)$ for the identified cell, and correct the identified cell with the corrected final value.

According to another aspect of the present invention, a method of x-ray imaging includes acquiring a set of pixelated imaging data, identifying a pixel to be corrected in the set of pixelated imaging data, interpolating $I_x$ and $I_y$ for the pixel based on neighbor pixels, calculating local gradients $g_x$ and $g_y$ between the identified pixel and its neighbor pixels based on $I_x$ and $I_y$, respectively, calculating weighting factors $w_x$ and $w_y$ based on the local gradients, calculating a final value $I(0,0)$ for the identified pixel, and correcting the value of the identified pixel with the final value $I(0,0)$.

According to yet another aspect of the present invention, a computer readable storage medium having a computer program stored thereon includes programming a computer to programming a computer to acquire a set of pixelated data, interpolate $I_x$ and $I_y$ for a bad pixel in the set of pixelated data using data from neighbor pixels, calculate local gradients $g_x$ and $g_y$ between the bad pixel and its neighbor pixels based on the interpolation, calculate weighting factors $w_x$ and $w_y$ using the local gradients $g_x$ and $g_y$, and calculate a corrected final value $I(0,0)$ for the bad pixel.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The operating environment of the present invention is described with respect to a sixty-four-slice computed tomography (CT) system. However, it will be appreciated by those skilled in the art that the present invention is equally applicable for use with other multi-slice configurations. Moreover, the present invention will be described with respect to the detection and conversion of x-rays. However, one skilled in the art will further appreciate that the present invention is equally applicable for the detection and conversion of other high frequency electromagnetic energy. The present invention will be described with respect to a "third generation" CT scanner, but is equally applicable with other CT systems and other x-ray imaging systems in general, such as x-ray imaging systems, RAD systems, mammography systems, ultrasound, optical imaging, magnetic resonance imaging, thermal imaging, positron emission tomography, and a nuclear medicine imaging system.

Figure 1:
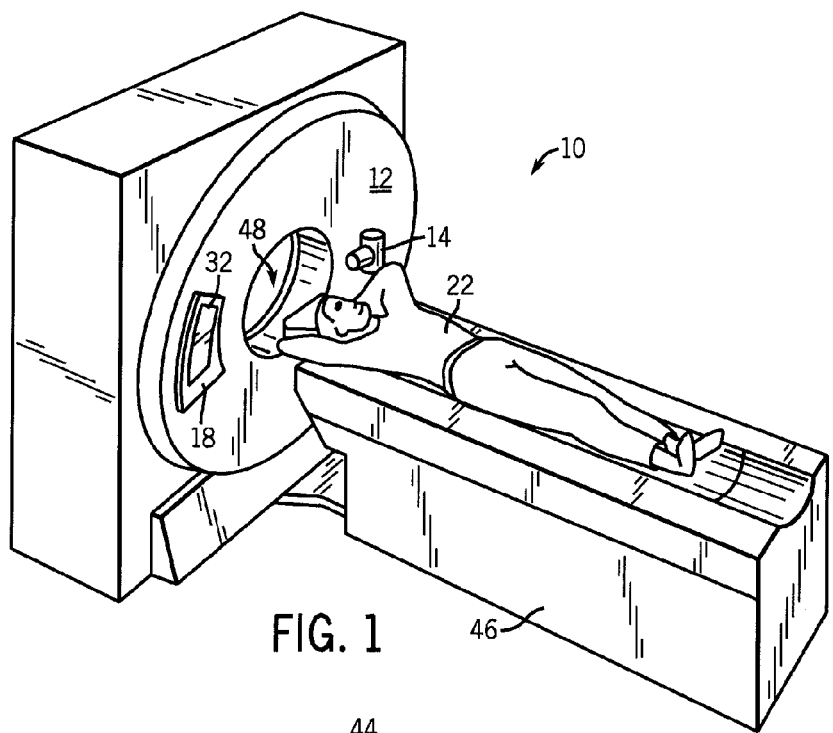
FIG. 1 is a pictorial view of a CT imaging system.
Figure 2:
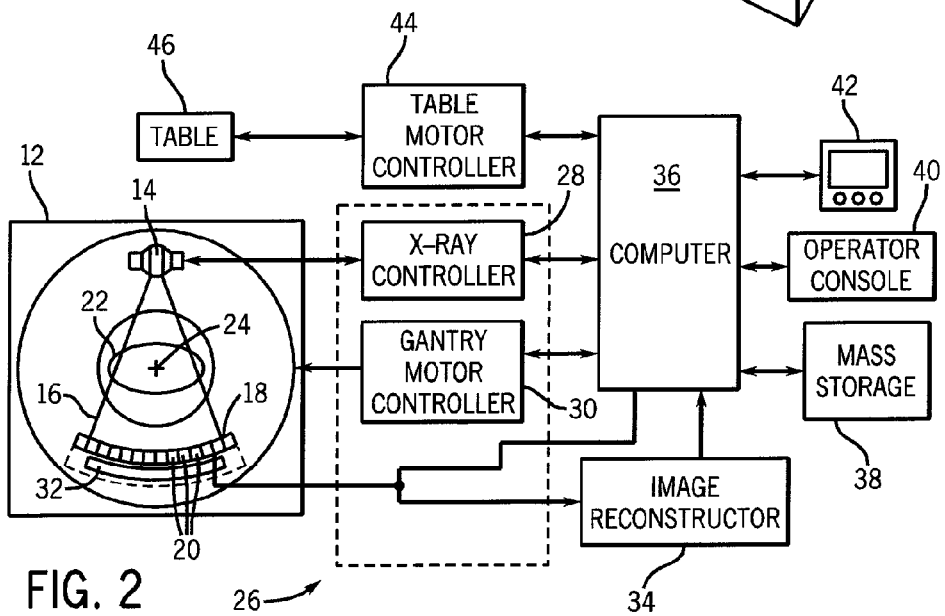
FIG. 2 is a block schematic diagram of the system illustrated in FIG. 1.

Referring to FIG. 1, a computed tomography (CT) imaging system 10 is shown as including a gantry 12 representative of a "third generation" CT scanner. Gantry 12 has an x-ray source 14 that projects a beam of x-rays 16 toward a detector assembly or collimator 18 on the opposite side of the gantry 12. Referring now to FIG. 2, detector assembly 18 is formed by a plurality of detectors 20 and data acquisition systems (DAS) 32. The plurality of detectors 20 sense the projected x-rays that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves patients 22 through a gantry opening 48 of FIG. 1 in whole or in part.

Figure 3:
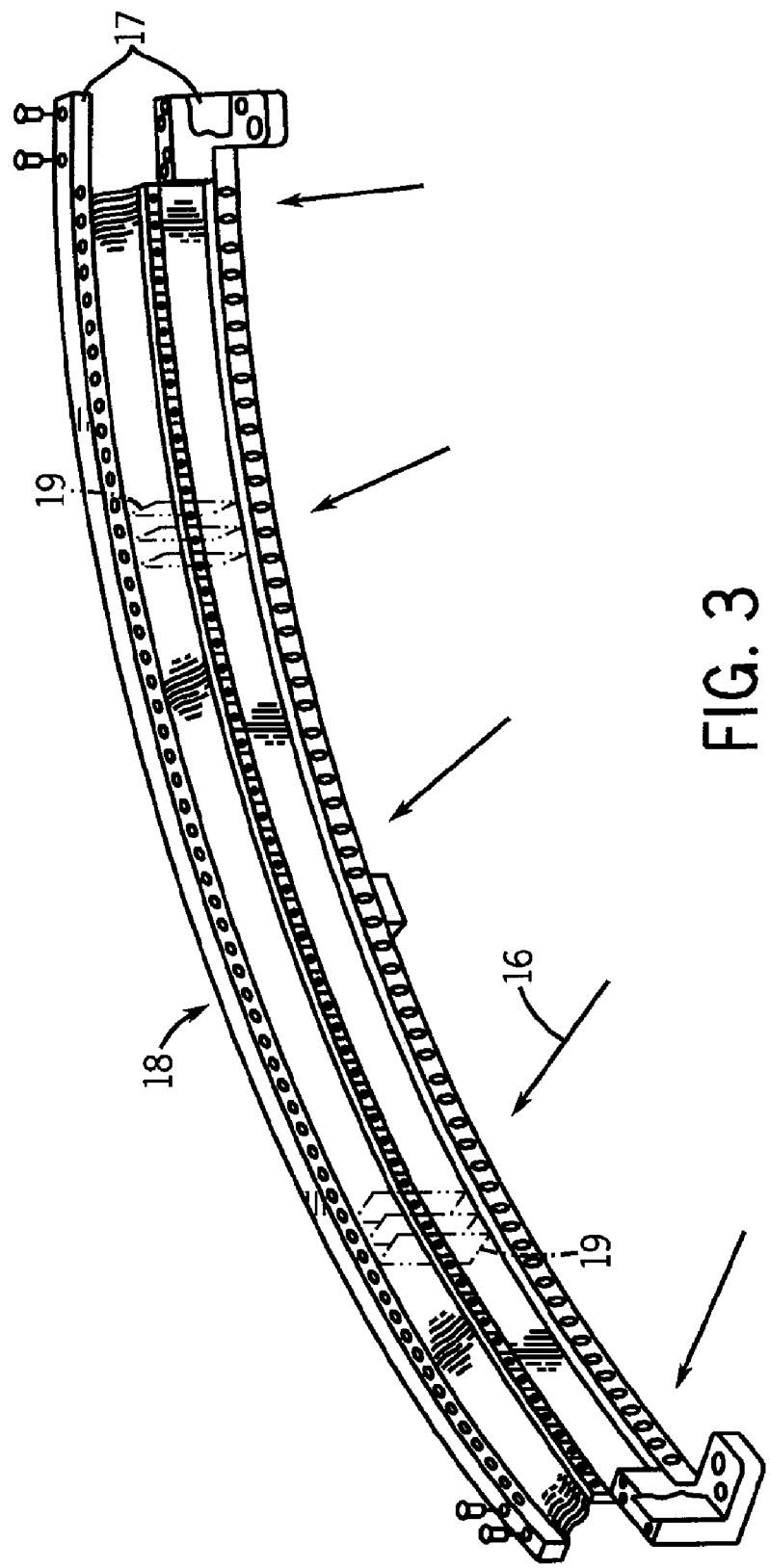
FIG. 3 is a perspective view of one embodiment of a CT system detector array.

As shown in FIG. 3, detector assembly 18 includes rails 17 having collimating blades or plates 19 placed therebetween. Plates 19 are positioned to collimate x-rays 16 before such beams impinge upon, for instance, detector 20 of FIG. 4 positioned on detector assembly 18. In one embodiment, detector assembly 18 includes 57 detectors 20, each detector 20 having an array size of 64×16 of pixel elements 50. As a result, detector assembly 18 has 64 rows and 912 columns (16×57 detectors) which allows 64 simultaneous slices of data to be collected with each rotation of gantry 12.

Figure 4:
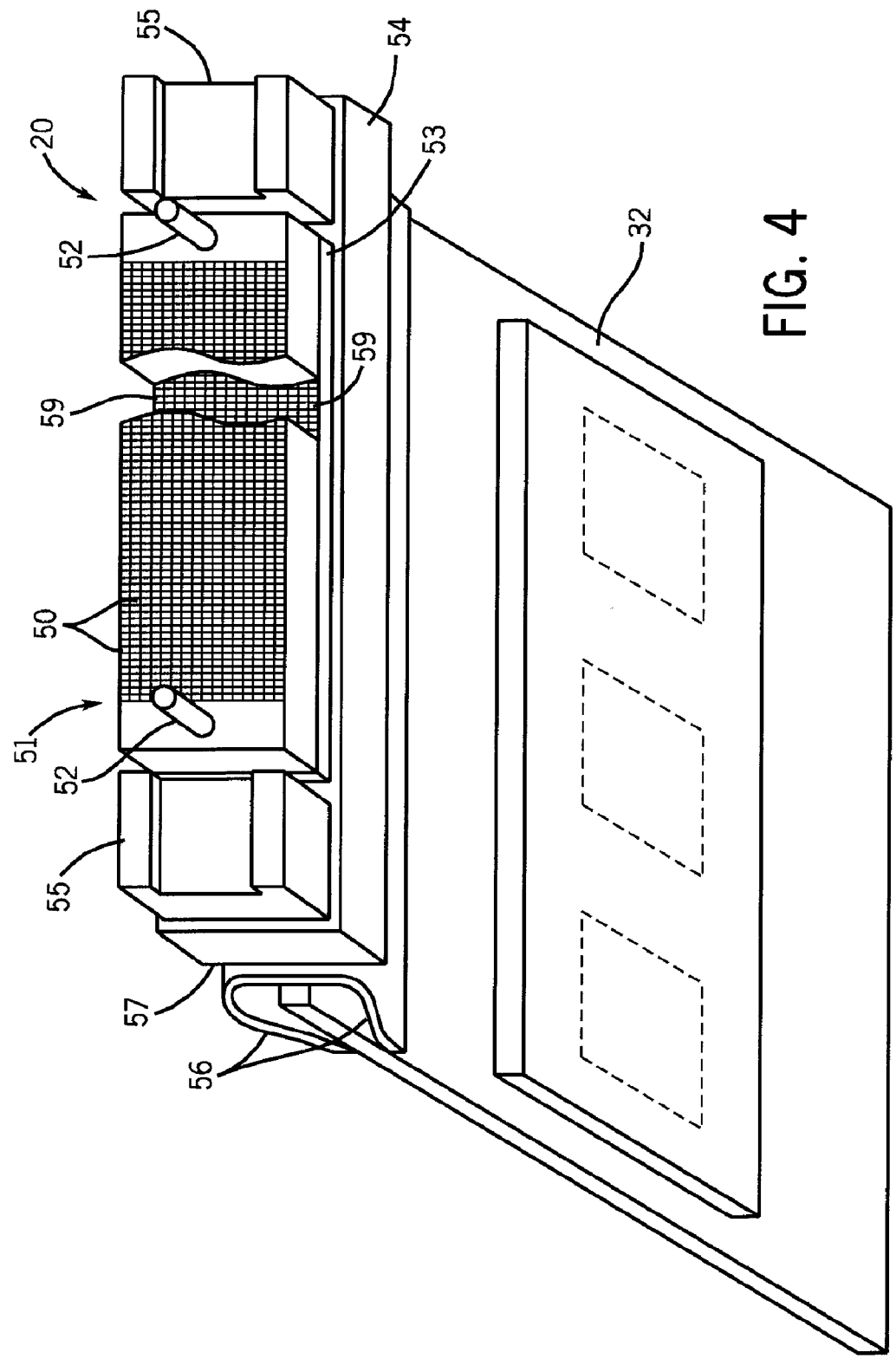
FIG. 4 is a perspective view of one embodiment of a detector.

Referring to FIG. 4, detector 20 includes DAS 32, with each detector 20 including a number of detector elements 50 arranged in pack 51. Detectors 20 include pins 52 positioned within pack 51 relative to detector elements 50. Pack 51 is positioned on a backlit diode array 53 having a plurality of diodes 59. Backlit diode array 53 is in turn positioned on multi-layer substrate 54. Spacers 55 are positioned on multi-layer substrate 54. Detector elements 50 are optically coupled to backlit diode array 53, and backlit diode array 53 is in turn electrically coupled to multi-layer substrate 54. Flex circuits 56 are attached to face 57 of multi-layer substrate 54 and to DAS 32. Detectors 20 are positioned within detector assembly 18 by use of pins 52.

In the operation of one embodiment, x-rays impinging within detector elements 50 generate photons which traverse pack 51, thereby generating an analog signal which is detected on a diode within backlit diode array 53. The analog signal generated is carried through multi-layer substrate 54, through flex circuits 56, to DAS 32 wherein the analog signal is converted to a digital signal.

Figure 5:
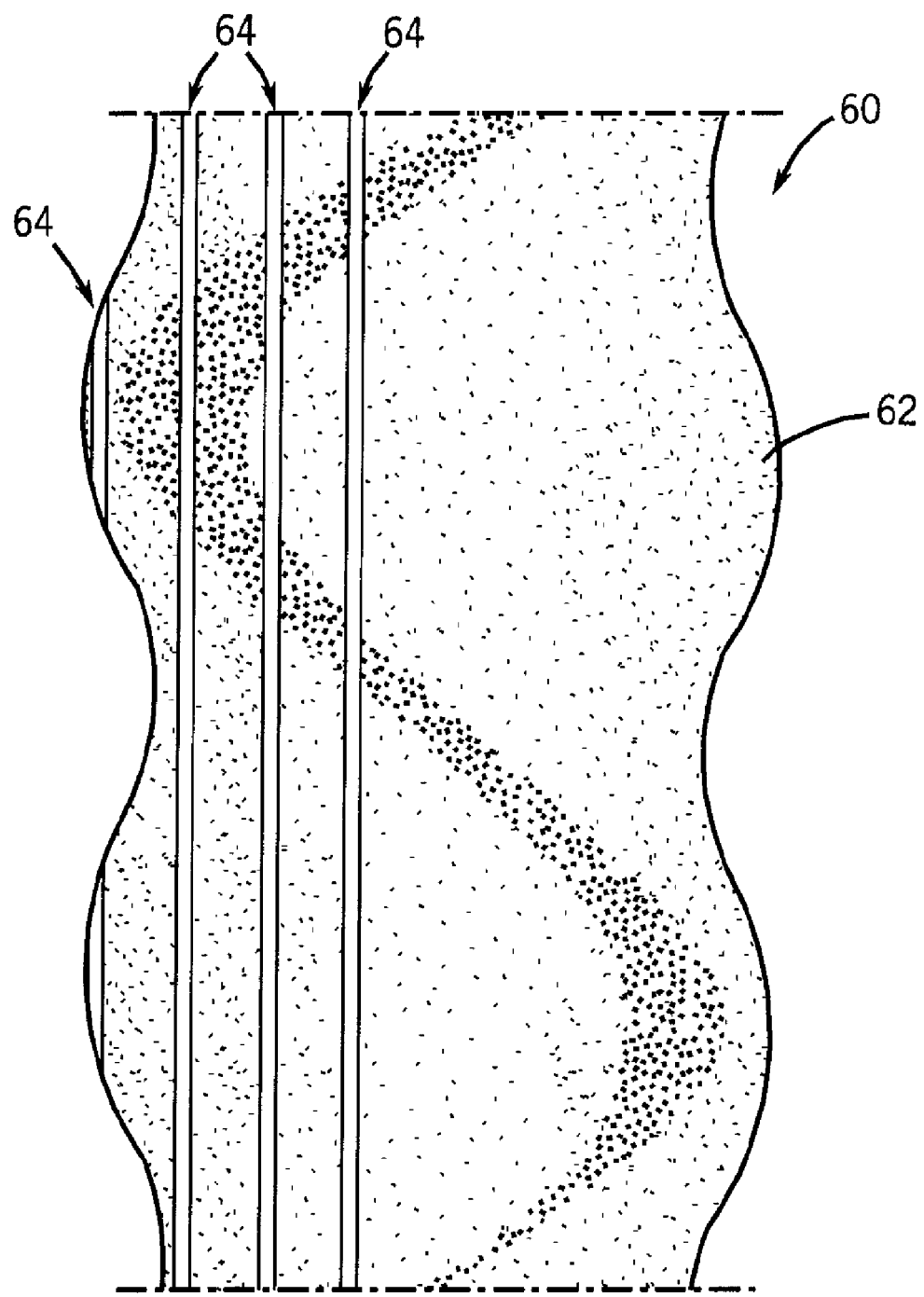
FIG. 5 is a schematic diagram of a sinogram having bad cell data therein.

FIG. 5 shows a sinogram 60 of CT data having been acquired via a detector assembly having at least one bad pixel developed thereon. Sinogram 60 includes valid pixel data 62 as well as invalid data shown as lines 64. Typically, data from a bad pixel that has developed an open condition will have a constant value. Data from a bad pixel that has developed a short condition with a neighboring pixel will typically follow or track the data from the neighboring pixel.

Figure 6:
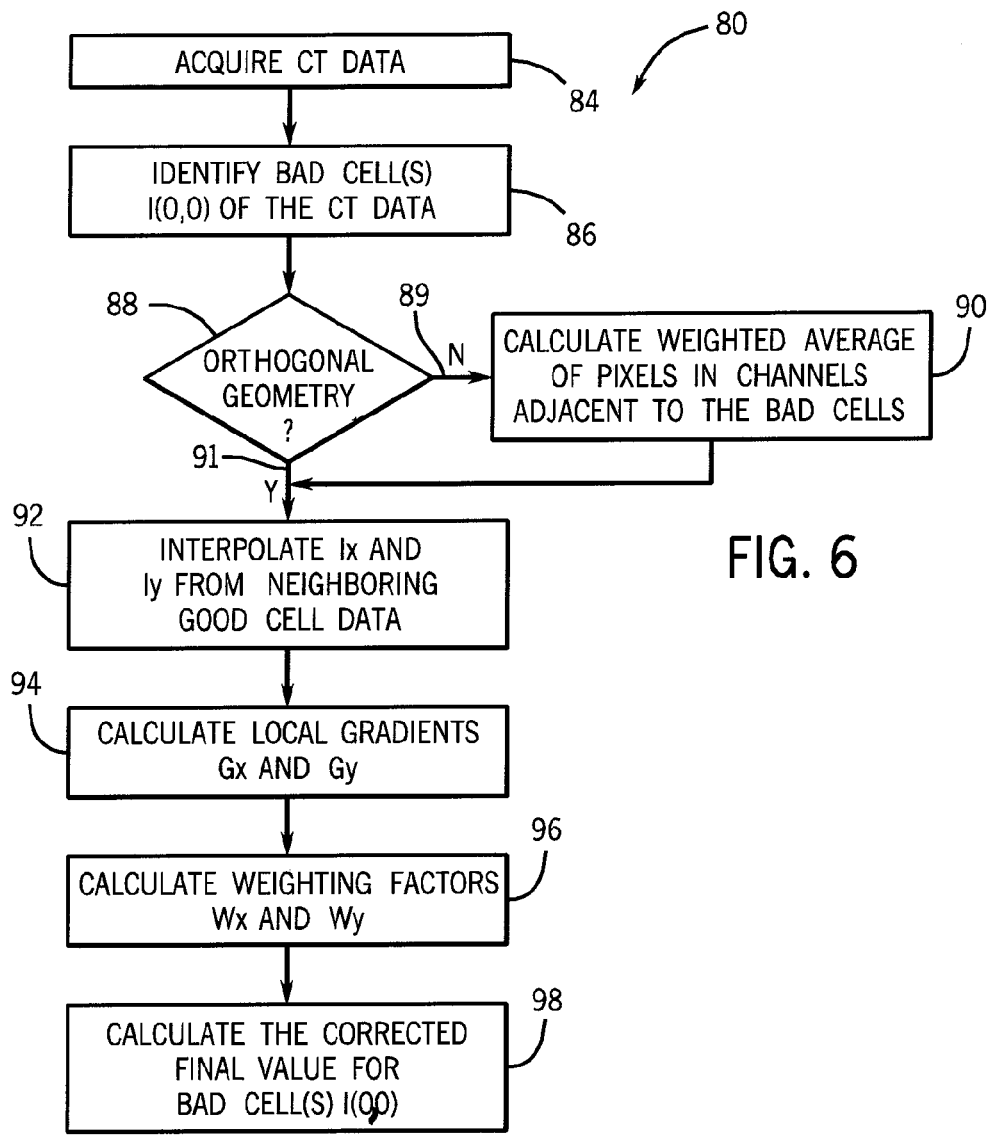
FIG. 6 is a flowchart illustrating a data correction technique according to an embodiment of the present invention.

Referring to FIG. 6, a data correction technique 80 for correcting bad cell data acquired during a CT scan, such as sinogram 60 of FIG. 5, is illustrated. Data correction technique 80 begins with the acquisition of CT data at 84. Following the acquisition 84, a bad cell or group of cells is identified from the acquired CT data at 86. As used herein, "I(0,0)," will refer to the data from each bad cell identified. The bad cell may be determined from, for instance, data in a sinogram, such as the sinogram 60 of FIG. 5. Technique 80 determines whether the geometry of the detector used to acquire the CT data is based on an orthogonal geometry at 88. If the detector does not have an orthogonal geometry 89, a weighted average of the data in cells of channels adjacent to the bad cell(s) is first calculated at 90 to determine a single value for $I_x$ on each side of the bad cell(s) in the x-direction 101 as graphically shown in FIG. 7.

Figure 7:
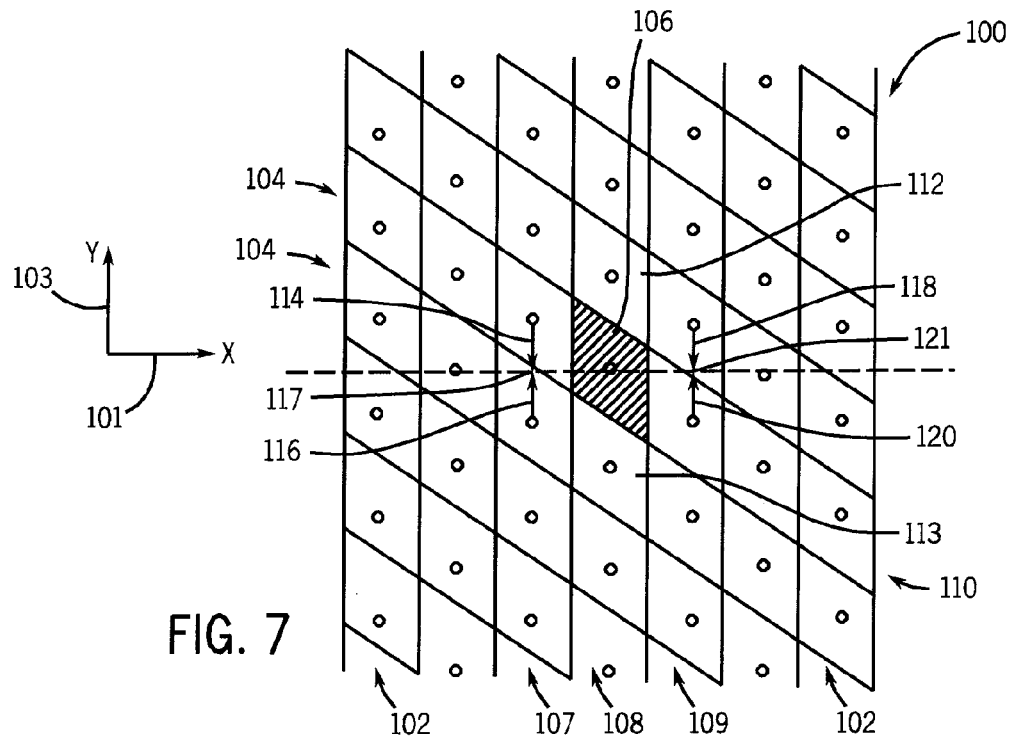
FIG. 7 is a plan view of a diagonal pixel array having a bad cell whose data is correctable using an embodiment of the present invention.

FIG. 7 shows pixels 100 of a detector that have a periodic but non-rectangular, or non-orthogonal geometry with respect to each other. Pixels 100 are arranged in channels 102 that are aligned parallel with the y-axis 103. Pixels 100 are further arranged in rows 104 that are not orthogonal to channels 102. One skilled in the art will readily appreciate that the angle between rows 104 and channels 102 may vary from that shown in FIG. 7. A bad cell 106 can result, for instance, from a short with one of its neighboring pixels, such as pixel 120. Bad cell 106 may instead result because of an open, or disconnected pixel, such as between a scintillator or detector element 50 and its respective diode 59 shown in FIG. 4, or between a diode 59 and its respective contact point on multi-layer substrate 54. Bad cell 106 may be a single cell or may be a block of cells bunched together in, for example, a 3×1 or a 3×3 block of cells.

Bad cell 106, determined in step 86 of technique 80, has a pair of neighboring pixels 114, 116 in adjacent channel 107 and a pair of neighboring pixels 118, 120 in adjacent channel 109 in the x-direction. Step 90 of technique 80 includes calculating a weighted average of pixels 114, 116 and calculating a weighted average of pixels 118, 120.

Figure 8:
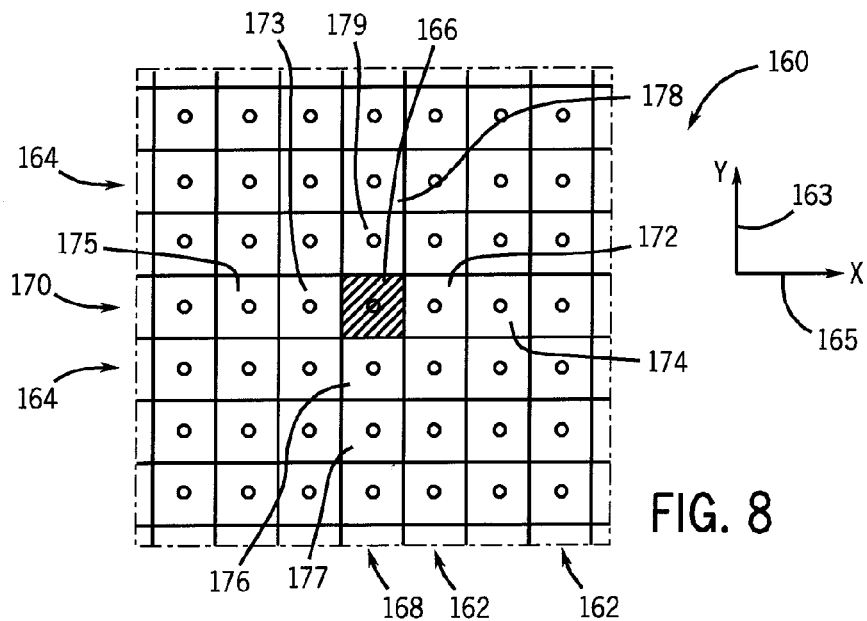
FIG. 8 is a plan view of an orthogonal pixel array having a bad cell whose data is correctable using an embodiment of the present invention.

Referring again to FIG. 6, once the weighted averages of pixels adjacent channels are calculated 90 or, alternatively, if the detector has an orthogonal geometry 91, $I_x$ and $I_y$ are calculated by interpolation at 92, using the weighted averages calculated in step 90 if the geometry is not orthogonal, or using the neighboring channel values if the geometry is orthogonal. $I_x$ and $I_y$ are calculated by interpolating data received from the neighboring pixels having good, or uncorrupted data therein. Referring to FIG. 7, $I_x$ is calculated by using a polynomial fit, an exponential fit, a power curve fit, or the like, with the weighted averages determined from pixels 114, 116 and pixels 118, 120. $I_y$ is calculated by using a polynomial fit, an exponential fit, a power curve fit, or the like, with pixels 112, 113. Referring to FIG. 8, pixels 160 of a detector that have an orthogonal geometry with respect to which other are shown. Pixels 160 are arranged in channels 162 and rows 164 that are aligned parallel with the y-axis 163 and x-axis 165, respectively. $I_x$ and $I_y$ for bad cell 166 are calculated by using a polynomial fit, an exponential fit, a power curve fit, or the like, with pixels 172, 173 and with pixels 176, 178, respectively. It is contemplated that interpolation of $I_x$ and $I_y$ may include using data from more than two pixels with valid data in each axis direction. For example, with respect to FIG. 8, the interpolation of $I_x$ and $I_y$ may be performed using pixels 172, 173, 174, and 175 in the x-direction and using pixels 176, 177, 178, and 179 in the y-direction. It is also contemplated that the polynomial fit may include a linear or higher order equation.

Referring again to FIG. 6, local gradients $g_x$ and $g_y$ are calculated at 94. In one embodiment, the local gradients $g_x$ and $g_y$ are calculated according to:

$$g_x(x_0, y_0) = \left.\frac{\partial I}{\partial x}\right|_{x=x_0}, \quad \text{(Eqn. 1)}$$

and $$g_y(x_0, y_0) = \left.\frac{\partial I}{\partial y}\right|_{y=y_0}, \quad \text{(Eqn. 2)}$$

where $$\frac{\partial I}{\partial}$$

represents a partial first derivative that can be approximated digitally using a Sobel operator, a Prewitt operator, or a Robinson operator.

After local gradients $g_x$ and $g_y$ are calculated at 94, weighting factors $w_x$ and $w_y$ are calculated at 96 according to:

$$w_x = \frac{|g_y|}{|g_x| + |g_y|}, \text{ and} \quad \text{(Eqn. 3)}$$

$$w_y = 1.0 - w_x. \quad \text{(Eqn. 4)}$$

Still referring to FIG. 6, a final value, I(0,0), for the bad cell or for each bad cell and a group of cells determined in step 86 is calculated at 98. In one embodiment, the final value, I(0,0), is calculated according to:

$$I(0,0) = w_x I_x + w_y I_y \quad \text{(Eqn. 5).}$$

When multiple bad pixels are grouped together, neighboring cells may be used to interpolate the group, using the technique 80 described above. Accordingly, the corrective technique described may be applied to a block of bad cells. A block of bad cells of for instance 3×3 may be corrected in the fashion described above, wherein the interpolation, gradients, and weighting functions are calculated for each bad cell in the block using data acquired from cells neighboring the block of bad pixels or cells.

It is contemplated that the technique described herein may be written as a computer program stored on a computer storage medium, which may in turn be applied to an imaging system where pixels are arranged in an orthogonal fashion, or where rows of the detector are arranged in a diagonal fashion with respect to the rows. When applying the above disclosed technique to CT data acquired from a detector with at least one bad pixel, a difference between conventional correction techniques and the technique described herein may be quantified by use of a Modulation Transfer Function (MTF). MTF is an objective quantification of image quality that measures the response of a system to different frequencies. The MTF may be used to assess the quality of a bad pixel correction technique, such as conventional correction techniques and the correction technique described herein. MTF is typically measured at 10% and 50% loss. As an example, applying the data correction technique 80 of FIG. 6 to a 3×3 set of open cells located three modules from iso-center resulted in a resolution loss of approximately 1-2% below the MTF resolution obtained without bad cells. As another example, using a simulated wire phantom, a simulated bank of 3×3 bad cells located approximately three modules from iso-center resulted in a resolution loss of 1.4% at 50% MTF, and less than 1% at 10% MTF, when compared to the simulated wire phantom having no bad pixels therein.

Figure 9:
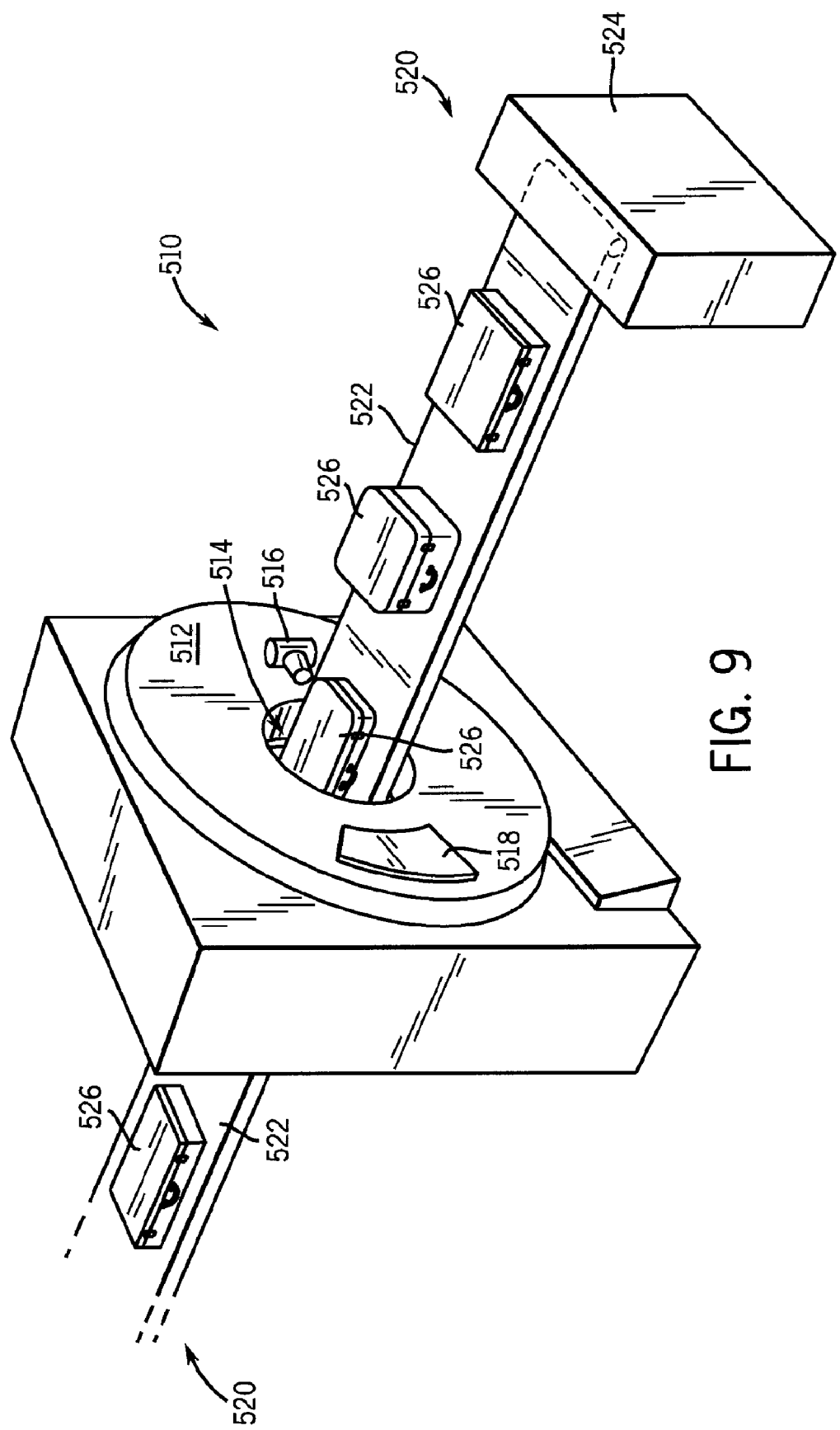
FIG. 9 is a pictorial view of a CT system for use with a non-invasive package inspection system.

Referring now to FIG. 9, package/baggage inspection system 510 includes a rotatable gantry 512 having an opening 514 therein through which packages or pieces of baggage may pass. The rotatable gantry 512 houses a high frequency electromagnetic energy source 516 as well as a detector assembly 518 having scintillator arrays comprised of scintillator cells similar to that shown in FIGS. 6 and 8. A conveyor system 520 is also provided and includes a conveyor belt 522 supported by structure 524 to automatically and continuously pass packages or baggage pieces 526 through opening 514 to be scanned. Objects 526 are fed through opening 514 by conveyor belt 522, imaging data is then acquired, and the conveyor belt 522 removes the packages 526 from opening 514 in a controlled and continuous manner. As a result, postal inspectors, baggage handlers, and other security personnel may non-invasively inspect the contents of packages 526 for explosives, knives, guns, contraband, etc.

According to one embodiment of the present invention, an imaging system includes a two-dimensional detector having a plurality of cells wherein each cell is configured to detect energy or signal passing through an object. The imaging system includes a computer programmed to acquire imaging data for the plurality of cells, identify a cell to be corrected, based on the imaging data, interpolate $I_x$ and $I_y$ for the identified cell based on neighbor cells, and calculate local gradients $g_x$ and $g_y$ between the identified cell and its neighbor cells based on the interpolation. The computer is further programmed to calculate weighting factors $w_x$ and $w_y$ based on the local gradients, calculate a corrected final value I(0,0) for the identified cell, and correct the identified cell with the corrected final value.

According to another embodiment of the present invention, a method of x-ray imaging includes acquiring a set of pixelated imaging data, identifying a pixel to be corrected in the set of pixelated imaging data, interpolating $I_x$ and $I_y$ for the pixel based on neighbor pixels, calculating local gradients $g_x$ and $g_y$ between the identified pixel and its neighbor pixels based on $I_x$ and $I_y$, respectively, calculating weighting factors $w_x$ and $w_y$ based on the local gradients, calculating a final value I(0,0) for the identified pixel, and correcting the value of the identified pixel with the final value I(0,0).

According to yet another embodiment of the present invention, a computer readable storage medium having a computer program stored thereon includes programming a computer to acquire a set of pixelated data, interpolate $I_x$ and $I_y$ for a bad pixel in the set of pixelated data using data from neighbor pixels, calculate local gradients $g_x$ and $g_y$ between the bad pixel and its neighbor pixels based on the interpolation, calculate weighting factors $w_x$ and $w_y$ using the local gradients $g_x$ and $g_y$, and calculate a corrected final value I(0,0) for the bad pixel.

The present invention has been described in terms of the preferred embodiment, and it is recognized that equivalents, alternatives, and modifications, aside from those expressly stated, are possible and within the scope of the appending claims.

What is claimed is:

1. An imaging system comprising:
a two-dimensional detector having a plurality of cells wherein each cell is configured to detect energy or signal passing through an object; and
a computer programmed to:
acquire imaging data for the plurality of cells;
identify a cell to be corrected, based on the imaging data;
interpolate $I_x$ and $I_y$ for the identified cell based on neighbor cells;
calculate local gradients $g_x$ and $g_y$ between the identified cell and its neighbor cells based on the interpolation;
calculate weighting factors $w_x$ and $w_y$ based on the local gradients, wherein the weighting factors $w_x$ and $w_y$ are calculated according to $$w_x = \frac{|g_y|}{|g_x| + |g_y|}; \text{ and } w_y = 1 - w_x;$$

calculate a corrected final value I(0,0) for the identified cell based on the calculated weighting factors; and
correct the identified cell with the corrected final value.

2. The imaging system of claim 1 wherein the energy or signal comprises x-rays passing through the object that are emitted from an x-ray source configured to emit an x-ray beam toward the object.

3. The imaging system of claim 1 wherein the two-dimensional detector further comprises scintillating elements optically coupled to a photodiode.

4. The imaging system of claim 1 wherein the imaging system comprises one of a CT system, an x-ray imaging system, a RAD system, a mammography system, an ultrasound system, an optical imaging system, a magnetic resonance imaging system, a thermal imaging system, a positron emission tomography system, and a nuclear medicine imaging system.

5. The imaging system of claim 1 wherein cells of the two-dimensional detector are arranged in an orthogonal geometry with respect to each other.

6. The imaging system of claim 1 wherein the two-dimensional detector is arranged in a periodic but non-rectangular array with respect to channels of the photodiode array.

7. The imaging system of claim 6 wherein $I_x$ is calculated by at least averaging two adjacent rows within a channel that is adjacent to the identified cell.

8. The imaging system of claim 1 wherein the interpolation is carried out using one of a polynomial fit, an exponential fit, and a power curve fit.

9. The imaging system of claim 1 wherein the calculation of the local gradients $g_x$ and $g_y$ comprises the computer programmed to calculate a partial first derivative for interpolated $I_x$ and $I_y$, respectively, using one of a Sobel operator, a Prewitt operator, and a Robinson operator.

10. A method of imaging, the method comprising:
acquiring a set of pixelated imaging data;
identifying a pixel to be corrected in the set of pixelated imaging data;
interpolating $I_x$ and $I_y$ for the pixel based on neighbor pixels;
calculating local gradients $g_x$ and $g_y$ between the identified pixel and its neighbor pixels based on $I_x$ and $I_y$, respectively;
calculating weighting factors $w_x$ and $w_y$ based on the local gradients, wherein the weighting factors $w_x$ and $w_y$ are calculated according to $$w_x = \frac{|g_y|}{|g_x| + |g_y|}; \text{ and } w_y = 1 - w_x;$$

calculating a final value I(0,0) for the identified pixel based on the calculated weighting factors; and
correcting the value of the identified pixel with the final value I(0,0).

11. The method of claim 10 wherein the acquired set of pixelated imaging data is CT x-ray data.

12. The method of claim 10 wherein interpolating $I_x$ further comprises averaging two adjacent rows within a channel adjacent to the identified pixel when the neighbor pixels are positioned in an angle pattern with respect to the identified pixel.

13. The method of claim 10 wherein interpolating $I_x$ and $I_y$ comprises interpolating $I_x$ and $I_y$ using one of a polynomial fit, an exponential fit, and a power curve fit.

14. The method of claim 10 wherein calculating local gradients $g_x$ and $g_y$ comprises approximating a partial first derivative of $I_x$ and $I_y$, respectively, using one of a Sobel operator, a Prewitt operator, and a Robinson operator.

15. A non-transitory computer readable storage medium having a computer program stored thereon and representing a set of instructions that when executed by a computer causes the computer to:
acquire a set of pixelated data;
interpolate $I_x$ and $I_y$ for a bad pixel in the set of pixelated data using data from neighbor pixels;
calculate local gradients $g_x$ and $g_y$ between the bad pixel and its neighbor pixels based on the interpolation;
calculate weighting factors $w_x$ and $w_y$ using the local gradients $g_x$ and $g_y$ by calculating:

$$w_x = \frac{|g_y|}{|g_x|+|g_y|} \text{ and } w_y = 1 - w_x;$$

and
calculate a corrected final value I(0,0) for the bad pixel based on the calculated weighting factors.

16. The computer readable storage medium of claim 15 wherein the set of pixelated data is x-ray data having been obtained from x-rays passing through an object.

17. The computer readable storage medium of claim 15 wherein the acquired set of pixelated data is from one of a CT system, an x-ray imaging system, a RAD system, a mammography system, an ultrasound system, an optical imaging system, a magnetic resonance imaging system, a thermal imaging system, a positron emission tomography system, and a nuclear medicine imaging system.

18. The computer readable storage medium of claim 15 wherein the instructions that cause the computer to interpolate $I_x$ and $I_y$ cause the computer to interpolate $I_x$ by averaging two adjacent rows within a channel adjacent to the bad pixel when the pixels are arranged in a diagonally cut pattern.

19. The computer readable storage medium of claim 15 wherein the instructions that cause the computer to interpolate $I_x$ and $I_y$ cause the computer to interpolate $I_x$ and $I_y$ using one of a polynomial fit, an exponential fit, and a power curve fit.

20. The computer readable storage medium of claim 15 wherein the instructions that cause the computer to calculate the local gradients $g_x$ and $g_y$ cause the computer to calculate the local gradients $g_x$ and $g_y$ as partial first derivatives of $I_x$ and $I_y$, respectively, using one of a Sobel operator, a Prewitt operator, and a Robinson operator.

21. An imaging system comprising:
a two-dimensional detector having a plurality of cells wherein each cell is configured to detect energy or signal passing through an object; and
a computer programmed to:
acquire imaging data for the plurality of cells;
identify a cell to be corrected, based on the imaging data;
interpolate $I_x$ and $I_y$ for the identified cell based on neighbor cells;
calculate local gradients $g_x$ and $g_y$ between the identified cell and its neighbor cells based on the interpolation;
calculate weighting factors $w_x$ and $w_y$ based on the local gradients;
calculate a corrected final value I(0,0) for the identified cell based on the calculated weighting factors; and
correct the identified cell with the corrected final value;
wherein the corrected final value I(0,0) is calculated according to:

$I(0,0)=w_x*I_x+w_y*I_y.$

22. A method of imaging, the method comprising:
acquiring a set of pixelated imaging data;
identifying a pixel to be corrected in the set of pixelated imaging data;
interpolating $I_x$ and $I_y$ for the pixel based on neighbor pixels;
calculating local gradients $g_x$ and $g_y$ between the identified pixel and its neighbor pixels based on $I_x$ and $I_y$, respectively;
calculating weighting factors $w_x$ and $w_y$ based on the local gradients;
calculating a final value I(0,0) for the identified pixel based on the calculated weighting factors according to $I(0,0)=w_x*I_x+w_y*I_y$; and
correcting the value of the identified pixel with the final value I(0,0).

23. A non-transitory computer readable storage medium having a computer program stored thereon and representing a set of instructions that when executed by a computer causes the computer to:
acquire a set of pixelated data;
interpolate $I_x$ and $I_y$ for a bad pixel in the set of pixelated data using data from neighbor pixels;
calculate local gradients $g_x$ and $g_y$ between the bad pixel and its neighbor pixels based on the interpolation;
calculate weighting factors $w_x$ and $w_y$ using the local gradients $g_x$ and $g_y$; and
calculate a corrected final value I(0,0) for the bad pixel based on the calculated weighting factors by calculating:

$I(0,0)=w_x*I_x+w_y*I_y.$

\* \* \* \* \*